United States Patent
Wang

[19]

[11] Patent Number: 6,053,303
[45] Date of Patent: Apr. 25, 2000

[54] TRANSPORTING ARTICLES

[76] Inventor: Chao-Yang Wang, 3Fl., No. 143-1, Chungshan Rd., Tamsui Chen, Taipei Hsien, Taiwan

[21] Appl. No.: 09/010,224

[22] Filed: Jan. 21, 1998

[51] Int. Cl.$^7$ .................................................. B65G 21/18
[52] U.S. Cl. ............................................................ 198/778
[58] Field of Search ................................. 198/778, 619, 198/657, 658, 625

[56] References Cited

U.S. PATENT DOCUMENTS

| | | | |
|---|---|---|---|
| 3,340,566 | 9/1967 | Woosley et al. | 198/778 X |
| 4,203,512 | 5/1980 | Ammeraal | 198/778 X |
| 4,343,394 | 8/1982 | Emmert et al. | 198/658 X |
| 4,643,295 | 2/1987 | Arnemann | 198/778 X |
| 5,447,223 | 9/1995 | Dasqupta | 198/778 |

FOREIGN PATENT DOCUMENTS

| | | | |
|---|---|---|---|
| 41308 | 2/1988 | Japan | 198/658 |
| 698854 | 11/1979 | U.S.S.R. | 198/778 |

Primary Examiner—James R. Bidwell
Attorney, Agent, or Firm—Kirkpatrick & Lockhart LLP

[57] ABSTRACT

An apparatus for transporting articles includes a hollow column (10), a shaft (33) furnished with a helical vane (34), and a motor (32). The helical column (10) has a helical track (11) formed therewithin which helically extends along the inner surface of the hollow column (10) in a first direction, and has a first communicating port (12) and a second communicating port (13). The shaft (33) with the helical vane (34) is coaxially and rotatably mounted within the hollow column (10). The helical vane (34) is fixedly mounted with and helically extends about the entire shaft (33) in a second direction opposite to the second direction. The motor (32) is disposed for driving the shaft (33) together with the helical vane (34) to rotate relative to the helical track (11), so that articles can be transported along the helical track (11) by the helical vane (34) between the first communicating port (12) and the second communicating port (13), so that articles can be transported from a first position to a second position. In such an arrangement, the space required for a transporting apparatus will be a minimum.

4 Claims, 4 Drawing Sheets

TRANSPORTING ARTICLES

BACKGROUND OF THE INVENTION

The present invention relates to an apparatus for transporting articles, and more particularly to an apparatus that can transport articles safely and without occupying too much space.

In conventional devices for transporting articles from a lower position to a higher position, such as a conveying belt or an elevator, a large space would be occupied. In view of this, the applicant has invented an apparatus for transporting articles, which may obviate and mitigate the problem.

BRIEF SUMMARY OF THE INVENTION

The primary object of the present invention is to provide an apparatus for transporting articles, which comprises a hollow column, a shaft furnished with a helical vane, and a motor. The hollow column has a helical track formed therewithin. The helical track is arranged to helically extend along the inner surface of the hollow column in a first direction. The hollow column has a first communicating port and a second communicating port defined therein whereby an article can enter or exit from the hollow column. The shaft with the helical vane is coaxially and rotatably mounted within the hollow column. The helical vane is fixedly mounted with the shaft and helically extends about the shaft in a second direction opposite to the first direction, whereby an article can be helically moved along the helical track of the hollow column by the helical vane when the shaft is rotated. The motor is disposed for driving the shaft together with the helical vane to rotate relative to the helical track so that an article can be transported between the first communicating port and the second communicating port by the helical vane so that the article can be transported from a first position to a second position.

Other novel features and advantages of the invention will become more apparent from the following detailed description when taken in conjunction with the accompanying drawings.

DETAILED DESCRIPTION OF THE PREFERRED EMBODIMENT

Figure 1:
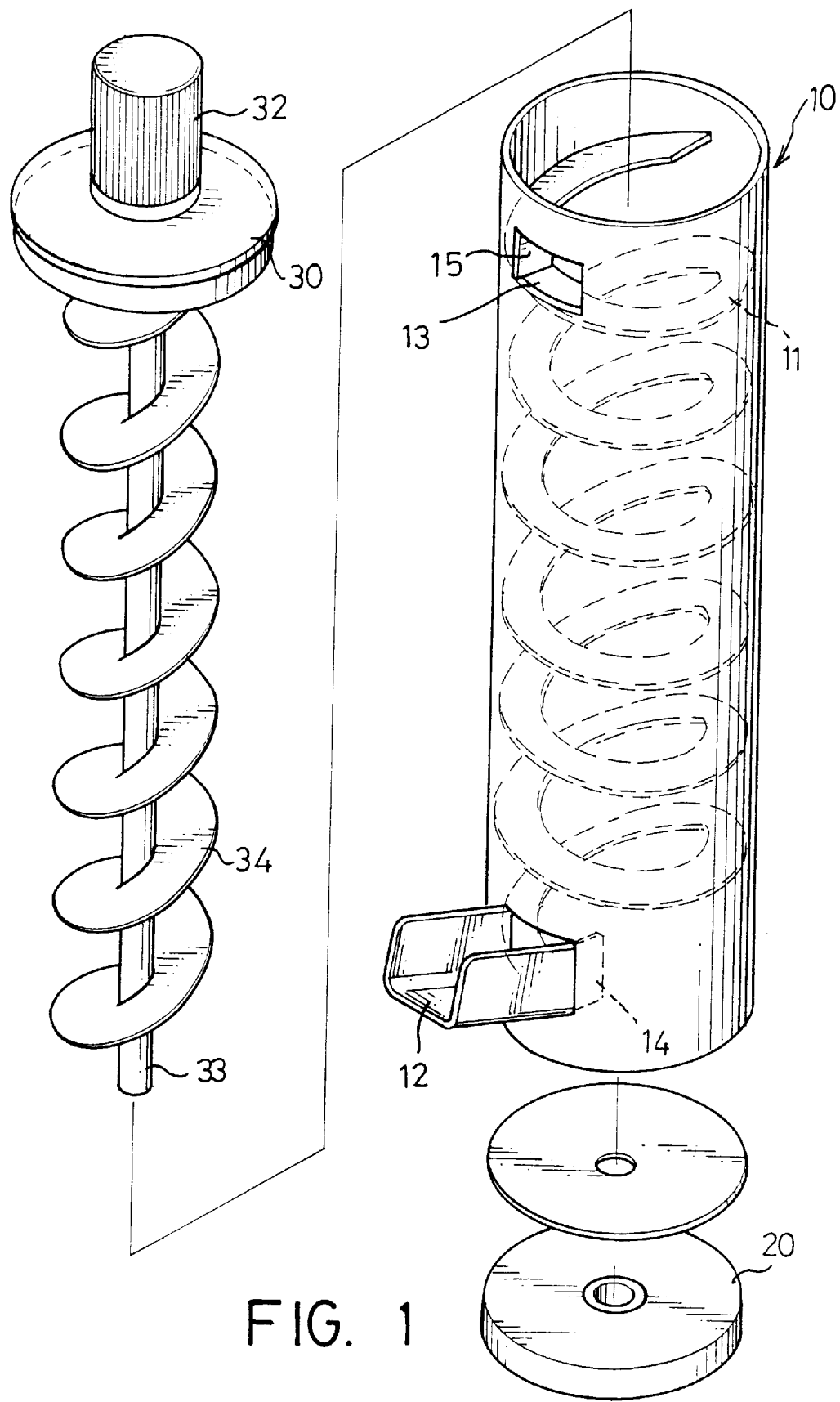
FIG. 1 is an exploded view of the present invention.

Referring to FIG. 1, an apparatus for transporting articles in accordance with the present invention is disclosed. The apparatus comprises a hollow column 10, a shaft 33 furnished with a helical vane 34, and a motor 32. The hollow column 10 has a helical track 11 formed therewithin and arranged to helically extend along the inner surface of the hollow column 10 in a first direction. As shown, the helical track 11 extends helically upwards along the inner surface of the hollow column 10 in a clockwise direction. The first column 10 has a first communicating port 12, which may be formed as a guiding chute as shown, and a second communicating port 13. Furthermore, the first communicating port 12 and the second communicating port 13 can be respectively provided with a releasable intercepting panel 14, 15 for facilitating an article to exit from the respective port, as will be fully understood after a consideration of the ensuing description.

The shaft 33 together with the helical vane 34 is coaxially and rotatably mounted within the hollow column 10. The shaft 33 is mounted within the hollow column respectively via two fixing collars 20, 30 mounted on two distal ends of the hollow column 10. The helical vane 34 is fixedly mounted with the shaft 33 and helically extends about the entire shaft 33 in a second direction opposite to the first direction, As shown, the helical vane 34 extends helically upwards in a counter-clockwise direction. Furthermore, a space between any two adjacent sections of the helical vane 34, which is substantially equal to that between any two adjacent sections of the helical track 11, is designed according to the dimension of an article to be transported. In such an arrangement, the shaft 33 together with the helical vane 34 can be accommodated within an elongated central space defined within the helical track 11 and can freely rotate relative to the helical track 11 when the shaft 33 is driven to rotate by a driving means, such as the motor 32, whereby an article can be helically moved along the helical track 11 of the hollow column 10, as will be fully described below.

Figure 2:
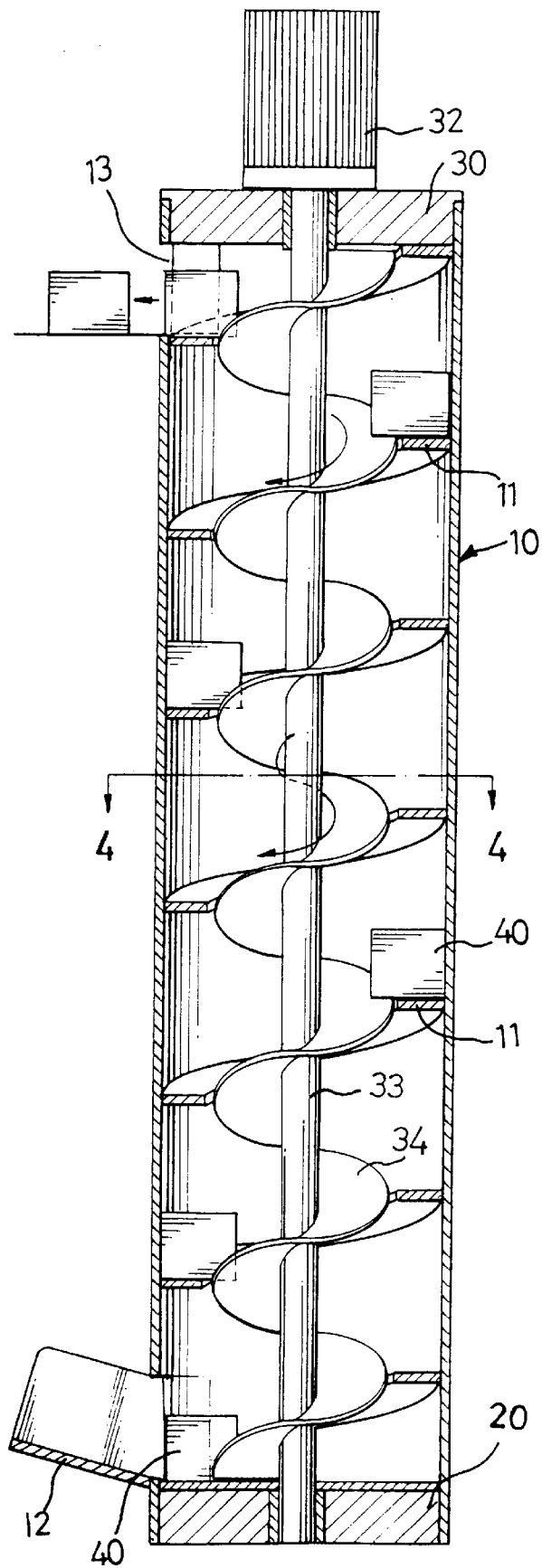
FIG. 2 is a sectional view of the present invention in which articles are continuously transported upwards along a helical track by a rotating helical vane.

In operation, as shown in FIG. 2, when an article 40 needs to be transported upwards from a lower position to a higher position, the article 40 may be put in the first communicating port or guiding chute 12. Thus, when the shaft 33 together with the helical vane 34 is driven to rotate relative to the helical track 11 in a first (clockwise) rotating direction, the article 40 can be pushed upwards by the helical track 11 to thereby move upwards along the helical track 11, thus finally exiting from the second communicating port or the upper port 13, with the aid of the intercepting panel 15.

Figure 3:
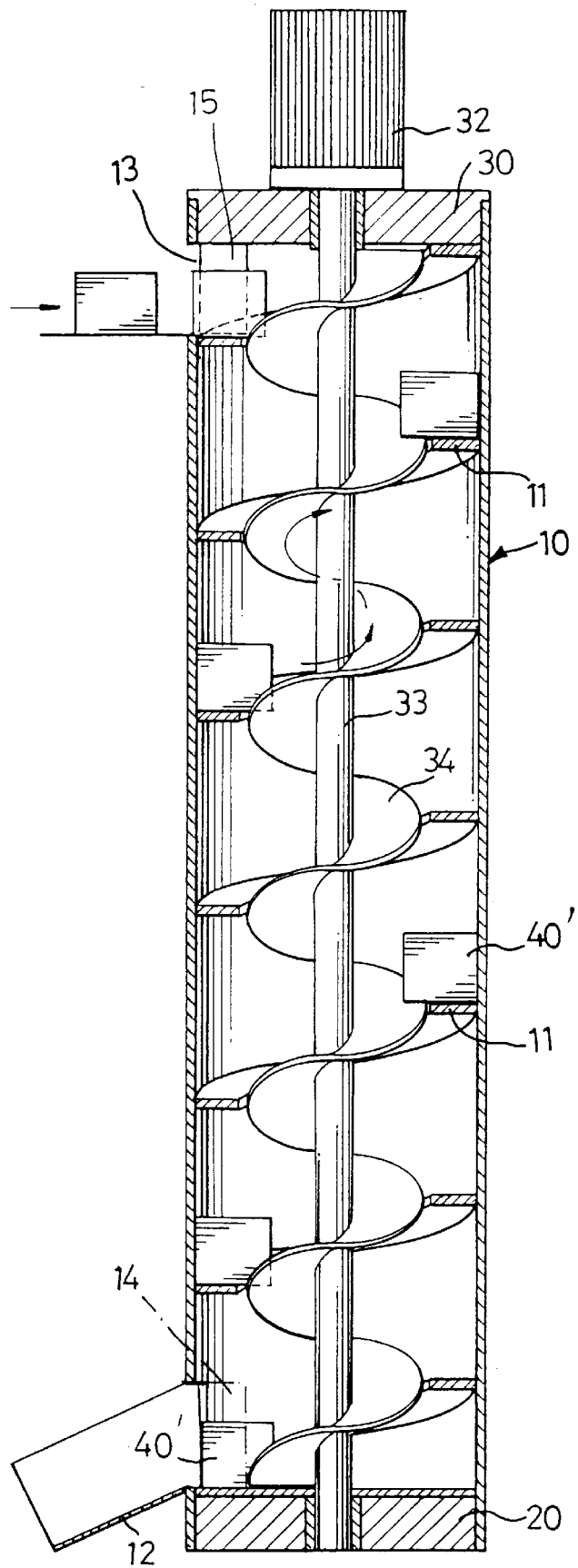
FIG. 3 is a sectional view of the present invention in which articles are continuously transported downwards along the helical track by the rotating helical vane.
Figure 4:
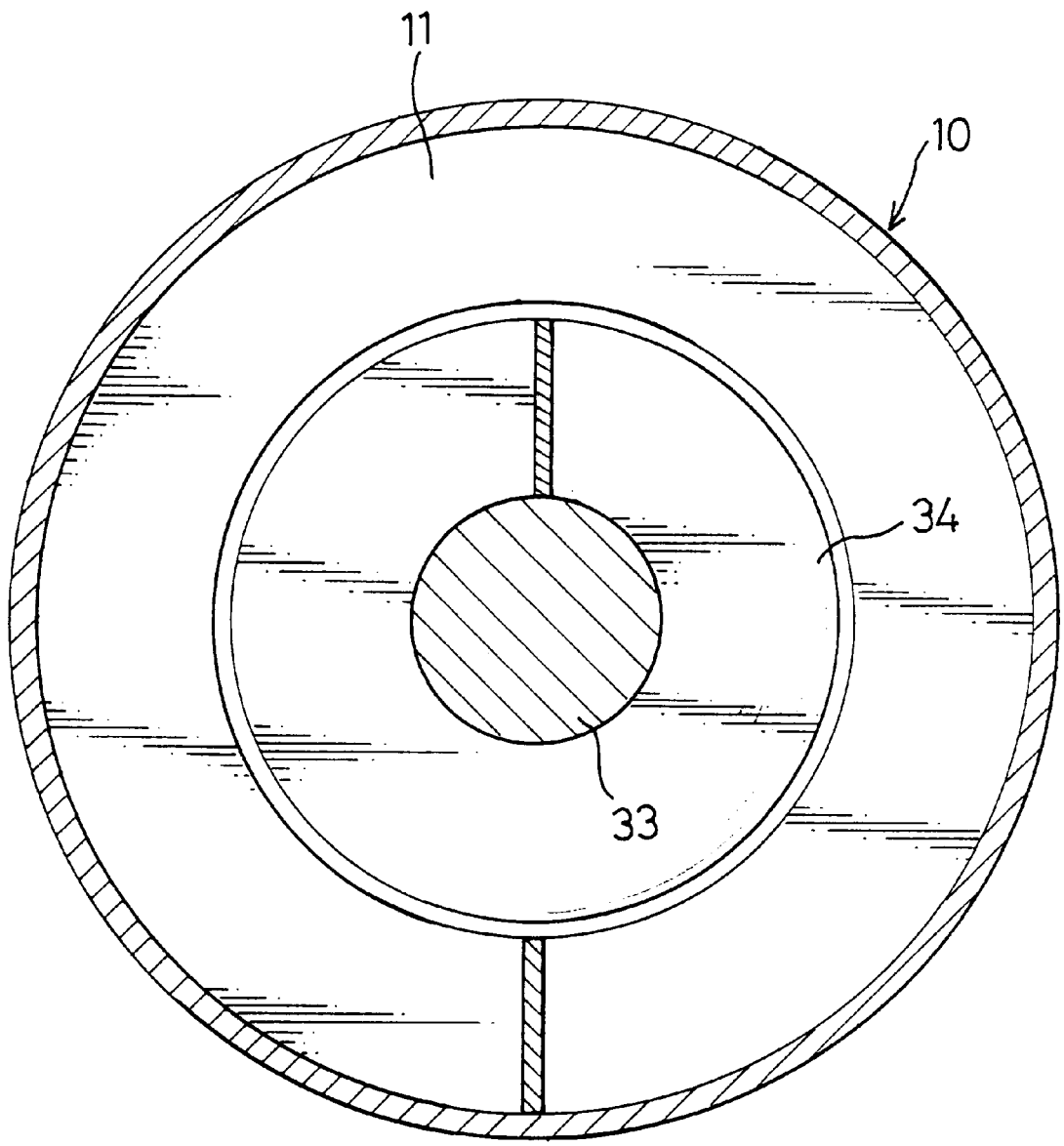
FIG. 4 is an enlarged sectional view taken along line 4—4 of FIG. 2.

Alternatively, as shown in FIG. 3, when an article 40' needs to be transported downwards from a higher position to a lower position, the article 40' may be put in the second communicating port 13. Thus, when the shaft 33 together with the helical vane 34 is driven to rotate relative to the helical track 11 in a second (counter-clockwise) direction, the article 40* can be pushed downwards by the helical track 11 to thereby move downwards along the helical track 11, thus finally exiting from the first communicating port or the guiding chute 12, with the aid of the intercepting panel 14.

Although the present invention has been described with a certain degree of particularity, it is understood that the present disclosure is made by way of example only and that numerous changes in the detail of construction and the combination and arrangement of parts may be resorted to without departing from the spirit and scope of the invention as hereinafter claimed.

What is claimed is:

1. Apparatus for transporting articles comprising:
   a hollow column having a helical track formed therewithin, said helical track helically extending along the inner surface of said hollow column in a first direction, said hollow column having a first communicating port and a second communicating port defined therein whereby an article can enter or exit from said hollow column;
   a shaft furnished with a helical vane, coaxially and rotatably mounted within said hollow column, said helical vane being fixedly mounted with and helically extending about said shaft in a second direction opposite to said first direction, whereby the article can be helically moved along said helical track of said hollow column by said helical vane furnished with said shaft when said shaft is rotated;

means for driving said shaft to rotate relative to said helical track so that the article can be transported between said first communicating port and said second communicating port so that the article can be transported from a first position to a second position; and wherein said first communicating port is releasably mounted with an intercepting panel for facilitating the article to exit from said first communicating port.

2. Apparatus as claimed in claim 1, wherein said shaft is mounted within said hollow column respectively via two fixing collars mounted on two distal ends of said hollow column.

3. Apparatus for transporting articles, comprising:

a hollow column having a helical track formed therewithin, said helical track helically extending along the inner surface of said hollow column in a first direction, said hollow column having a first communicating port and a second communicating port defined therein whereby an article can enter or exit from said hollow column;

a shaft furnished with a helical vane, coaxially and rotatably mounted within said hollow column, said helical vane being fixedly mounted with and helically extending about said shaft in a second direction opposite to said first direction whereby the article can be helically moved along said helical track of said hollow column by said helical van furnished with said shaft when said shaft is rotated;

means for driving said shaft to rotate relative to said helical track so that the article can be transported between said first communicating port and said second communicating port so that the article can be transported form a first position to a second position; and wherein said second communicating port is releasably mounted with a second intercepting panel for facilitating the article to exit from said second communicating port.

4. Apparatus as claimed in claim 3, wherein said shaft is mounted within said hollow column respectively via two fixing collars mounted on two distal ends of said hollow column.

\* \* \* \* \*